(12) United States Patent
Zhao et al.

(10) Patent No.: US 12,418,070 B2
(45) Date of Patent: Sep. 16, 2025

(54) POWER TOOL AND BATTERY PACK

(71) Applicant: Nanjing Chervon Industry Co., Ltd., Nanjing (CN)

(72) Inventors: Xiaozhe Zhao, Nanjing (CN); Toshinari Yamaoka, Nanjing (CN); Yuexiang Zhang, Nanjing (CN); Xiaopan Liu, Nanjing (CN); Zhihai Teng, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 558 days.

(21) Appl. No.: 17/880,423

(22) Filed: Aug. 3, 2022

(65) Prior Publication Data
US 2023/0065277 A1    Mar. 2, 2023

(30) Foreign Application Priority Data

Aug. 31, 2021   (CN) .......................... 202111012566.2
Aug. 31, 2021   (CN) .......................... 202111014249.4
(Continued)

(51) Int. Cl.
  *H01M 50/244*   (2021.01)
  *H01M 10/623*   (2014.01)
  (Continued)

(52) U.S. Cl.
  CPC ....... *H01M 50/244* (2021.01); *H01M 10/623* (2015.04); *H01M 10/643* (2015.04);
  (Continued)

(58) Field of Classification Search
  None
  See application file for complete search history.

(56) References Cited

U.S. PATENT DOCUMENTS

2011/0197389 A1* 8/2011 Ota .................. H02J 7/007182
                                                          429/121
2013/0095360 A1* 4/2013 Niedzwiecki ..... H01M 10/0413
                                                          429/100

FOREIGN PATENT DOCUMENTS

CN       111584788 A   *  8/2020
JP         5432761 B2  *  3/2014   ........... A47L 9/2884
WO    WO-2019080935 A1 *  5/2019   ........... A01D 34/008

OTHER PUBLICATIONS

Abstract of JP-5432761-B2 (Year: 1999).*
Machine Translation of CN 111584788A (Year: 2020).*

* cited by examiner

*Primary Examiner* — Gregg Cantelmo
(74) *Attorney, Agent, or Firm* — Greenberg Traurig, LLC

(57) ABSTRACT

A power tool includes an output member for outputting power, a motor for driving the output member, a housing including a battery pack accommodating portion provided with a first battery pack accommodating cavity and a guide structure for guiding a battery pack to be inserted into the first battery pack accommodating cavity along a first straight line. The battery pack includes a basic housing portion provided with a first accommodating cavity, a first cell group disposed inside the first accommodating cavity, an extended housing portion provided with a second accommodating cavity, and a second cell group disposed inside the second accommodating cavity. The first cell group is at least partially disposed inside the first battery pack accommodating cavity, and the second cell group is at least partially disposed outside the first battery pack accommodating cavity.

17 Claims, 14 Drawing Sheets

(30) Foreign Application Priority Data

Aug. 31, 2021 (CN) .......................... 202111014289.9
Aug. 31, 2021 (CN) .......................... 202122089383.2
Aug. 31, 2021 (CN) .......................... 202122091164.8
Aug. 31, 2021 (CN) .......................... 202122093651.8

(51) Int. Cl.
*H01M 10/643* (2014.01)
*H01M 50/213* (2021.01)
*H01M 50/247* (2021.01)
*H01M 50/284* (2021.01)
*H01M 50/502* (2021.01)
*H01M 50/528* (2021.01)

(52) U.S. Cl.
CPC ....... *H01M 50/213* (2021.01); *H01M 50/247* (2021.01); *H01M 50/284* (2021.01); *H01M 50/502* (2021.01); *H01M 50/528* (2021.01); *H01M 2220/30* (2013.01)

POWER TOOL AND BATTERY PACK

RELATED APPLICATION INFORMATION

This application claims the benefit under 35 U.S.C. § 119(a) of Chinese Patent Application No. CN 202111012566.2, filed on Aug. 31, 2021, Chinese Patent Application No. CN 202111014289.9, filed on Aug. 31, 2021, Chinese Patent Application No. CN 202122093651.8, filed on Aug. 31, 2021, Chinese Patent Application No. CN 202111014249.4, filed on Aug. 31, 2021, Chinese Patent Application No. CN 202122091164.8, filed on Aug. 31, 2021, and Chinese Patent Application No. CN 202122089383.2, filed on Aug. 31, 2021, which applications are incorporated herein by reference in their entirety.

BACKGROUND

Power tools on the market are generally powered in two manners. One is an external power supply, and the other is a battery pack. If the external power supply is used, the power tools can only work in places with power interfaces, which greatly limits the range where the power tools are applied. The battery pack can solve the problem well. However, the power tools will work under various working conditions, and the requirement for the endurance of the battery pack depends on different working conditions. In some cases, the power tools are required to work for a long time, and thus a large-capacity battery pack needs to be mounted. In some other cases, the battery pack is not required to have relatively great endurance, and the installation of a relatively large battery pack causes inconvenience to a user. Currently, the power tools on the market cannot solve this problem.

SUMMARY

A power tool includes an output member for outputting power, a motor for driving the output member, a housing for accommodating at least part of the motor, and a battery pack for powering the motor. The housing includes a battery pack accommodating portion provided with a first battery pack accommodating cavity and a guide structure for guiding the battery pack to be inserted into the first battery pack accommodating cavity along a direction of a first straight line. The battery pack includes a basic housing portion provided with a first accommodating cavity, a first cell group disposed inside the first accommodating cavity, an extended housing portion provided with a second accommodating cavity, and a second cell group disposed inside the second accommodating cavity. The first cell group is at least partially disposed inside the first battery pack accommodating cavity, and the second cell group is at least partially disposed outside the first battery pack accommodating cavity.

A battery pack is applicable to a power tool and detachably mounted to a first battery pack accommodating cavity of the power tool. The battery pack includes a battery pack housing, a cell assembly, an interface circuit board, and an electrode plate terminal assembly. The cell assembly includes a first cell group and a second cell group which are disposed inside the battery pack housing, where the first cell group is at least partially disposed inside the first battery pack accommodating cavity, and the second cell group is at least partially disposed outside the first battery pack accommodating cavity. The interface circuit board is at least partially disposed inside the battery pack housing. The electrode plate terminal assembly is used for electrically connecting the battery pack to tool terminals of the power tool, where electrical conductivity of the electrode plate terminal assembly is greater than or equal to 30% IACS and less than or equal to 100% IACS, and the electrode plate terminal assembly includes at least a positive terminal assembly and a negative terminal assembly which are mounted to the interface circuit board.

A battery pack is applicable to a power tool and detachably mounted to a first battery pack accommodating cavity of the power tool. The battery pack includes a battery pack housing and an interface circuit board which is mounted to the battery pack housing. The battery pack further includes a first cell group, a second cell group, and a connection device. The first cell group is disposed inside the battery pack housing, where the first cell group includes multiple first cells and a first positive terminal and a first negative terminal which are used for electrically connecting the first cell group to the interface circuit board. The second cell group is disposed inside the battery pack housing, where the second cell group includes multiple second cells and a second positive terminal and a second negative terminal which are used for electrically connecting the second cell group to the interface circuit board, the first cell group is at least partially disposed inside the first battery pack accommodating cavity, and the second cell group is at least partially disposed outside the first battery pack accommodating cavity. The connection device is electrically connected to the first positive terminal and the second positive terminal, where the connection device is electrically connected to the interface circuit board. Alternatively, the connection device is electrically connected to the first negative terminal and the second negative terminal, where the connection device is electrically connected to the interface circuit board.

DETAILED DESCRIPTION

Figure 1:
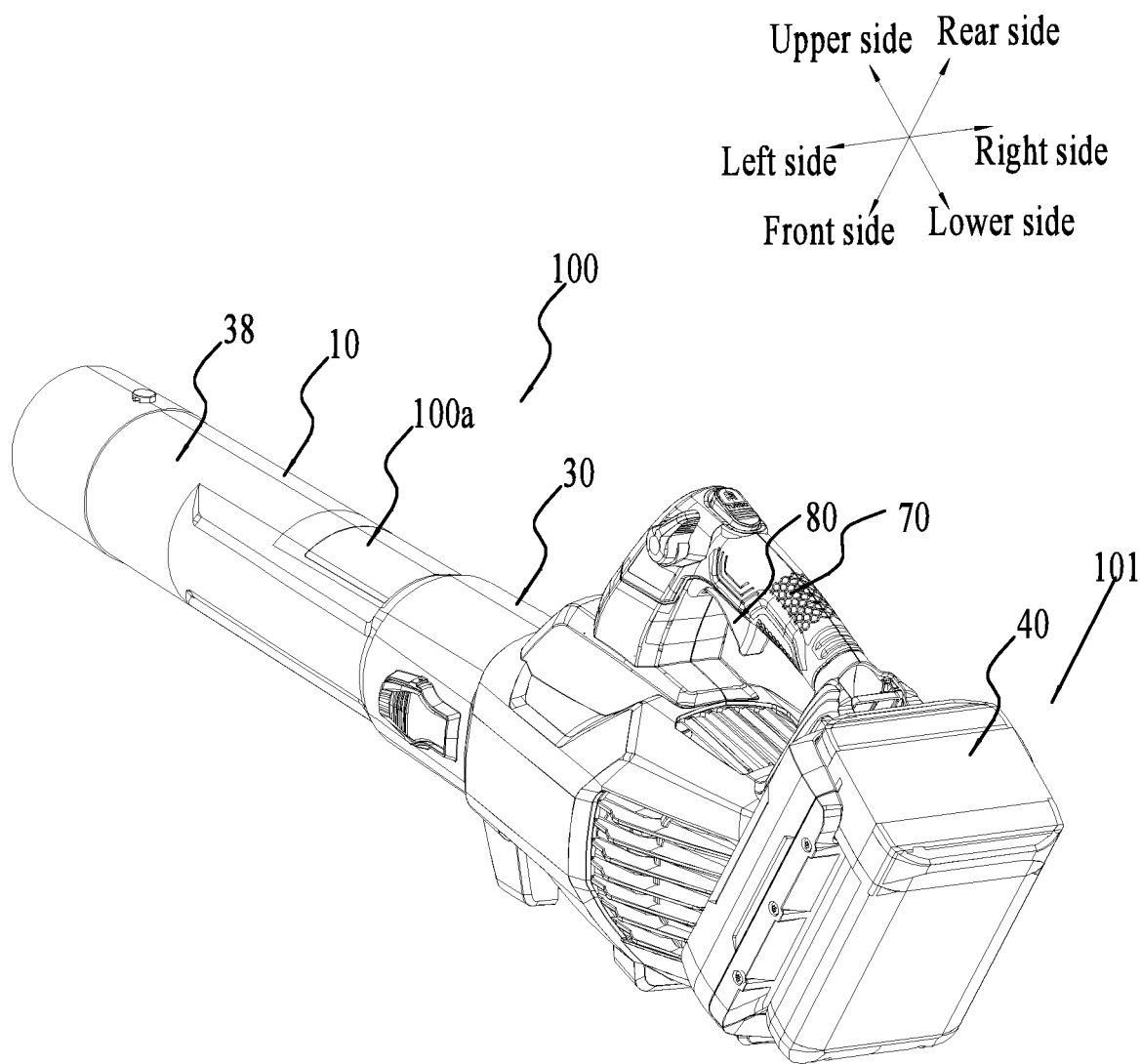
FIG. 1 is a perspective view of a blower shown in the present application.

As shown in FIG. 1, a power tool for mounting a battery pack 40 to a tool body 100a along a direction of a first straight line 101 is provided, which is specifically exemplified by a blower 100 in the present application. The blower 100 can be operated by a user to clean things such as leaves, grass, snow, and dust. Of course, it is to be understood that the power tool may be another type of tool such as a string trimmer, a snow thrower, a pole saw, or a chain saw. In fact, as long as these tools include the substance described below in the present application, these tools all fall within the scope of the present application.

Figure 2:
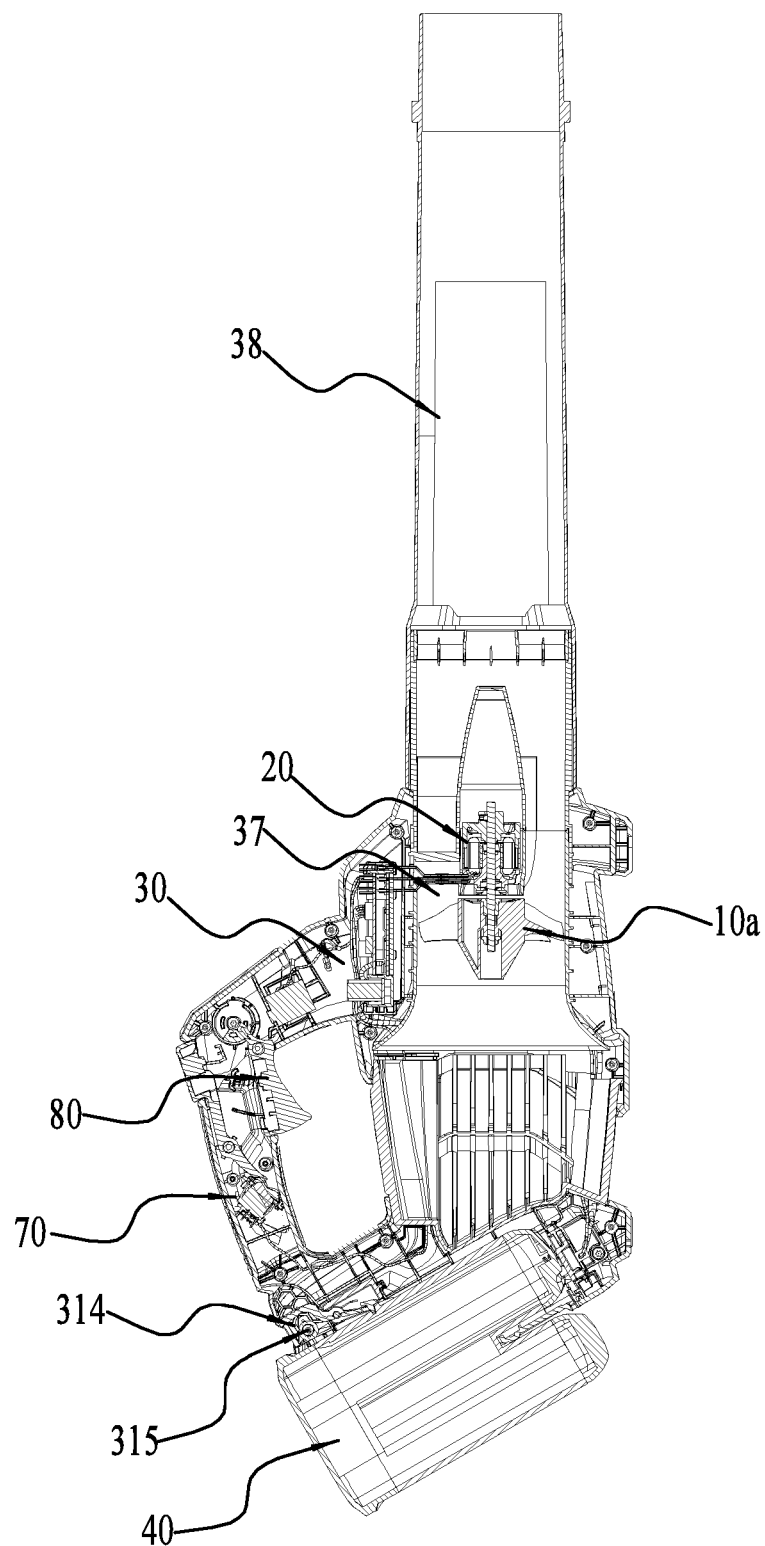
FIG. 2 is a sectional view of the blower shown in FIG. 1.
Figure 3:
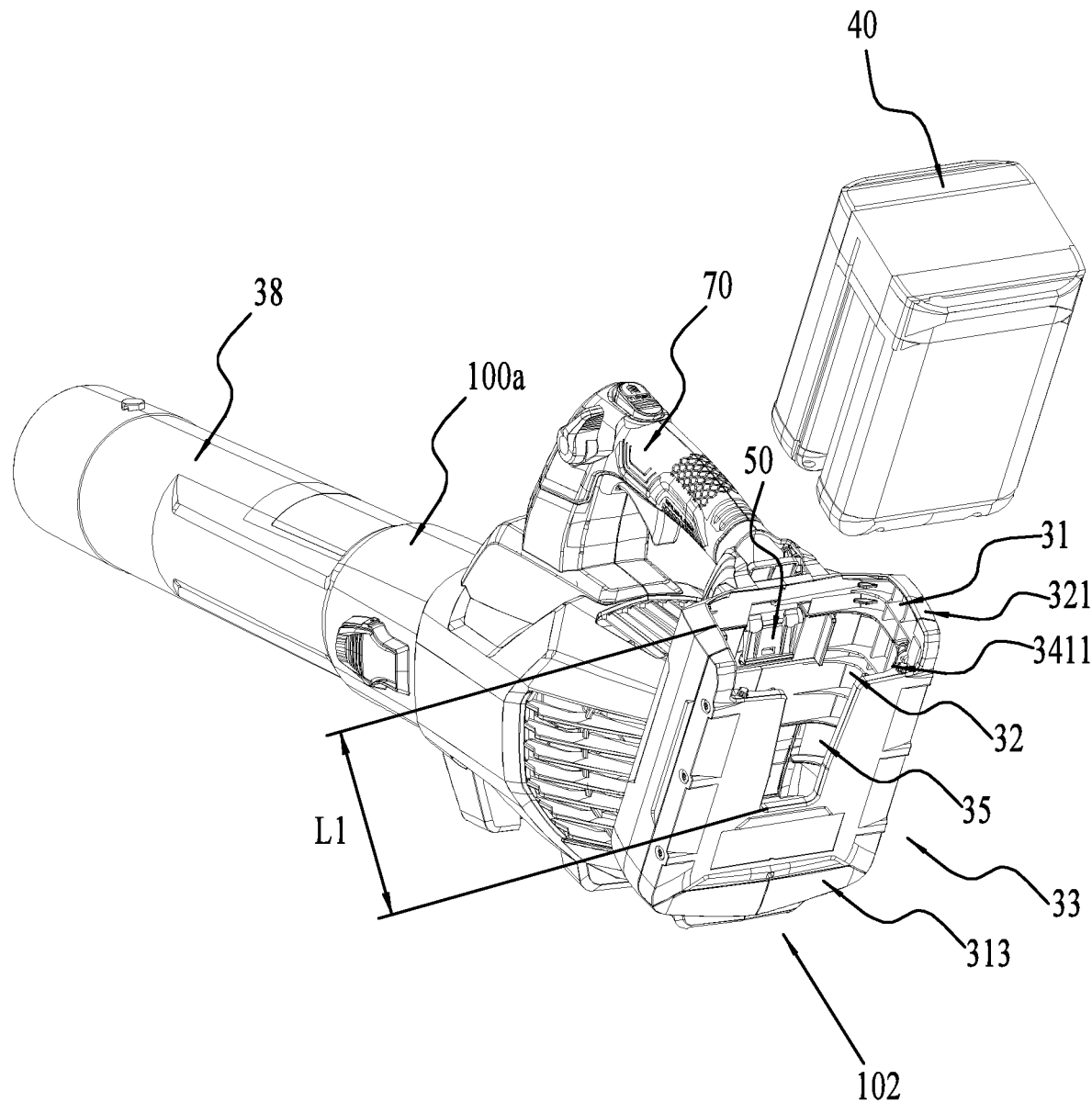
FIG. 3 is a perspective view of a tool body and a battery pack of the blower shown in FIG. 1, which are separated from each other.

As shown in FIGS. 1 to 3, the blower 100 includes the tool body 100a and the battery pack 40. The tool body 100a includes an output member 10, a motor 20, a housing 30, a handle 70, and a switch assembly 80.

The output member 10 is a fan 10a and used for outputting power, that is, the fan 10a rotates to generate an airflow.

The motor 20 is used for driving the fan 10a to rotate.

An accommodating space 37 is formed in the housing 30, and the motor 20 is at least partially disposed in the accommodating space 37. The housing 30 is provided with or fixedly connected to an air tube 38, and the air tube 38 is provided with an air duct through which the airflow circulates. That is, the motor 20 drives the fan 10a to rotate, thereby generating the airflow which is finally blown out from the air tube 38. The handle 70 for the user to hold is fixedly connected to the housing 30 or integrally formed with the housing 30. The switch assembly 80 for starting the motor 20 is disposed on the handle 70 such that the user can operate the switch assembly 80 conveniently when holding the handle 70.

The battery pack 40 is used for powering the motor 20. The battery pack 40 can be mounted to the housing 30 along the direction of the first straight line 101.

As shown in FIGS. 7 to 10, the battery pack 40 includes a basic portion 41, an extended portion 43, and a connecting portion 42, where the basic portion 41 is spaced apart from the extended portion 43, and the connecting portion 42 is disposed between the basic portion 41 and the extended portion 43 and used for connecting the basic portion 41 to the extended portion 43. The extended portion 43 is connected in parallel to the basic portion 41 so that the capacity of the battery pack 40 is extended, that is, the capacity of the extended portion 43 may be increased as required so as to increase the total capacity of the battery pack 40.

A battery pack housing 47 forms the appearance of the battery pack 40. The battery pack housing 47 includes a basic housing portion 44, a connecting housing portion 421, and an extended housing portion 431, where the basic housing portion 44 is spaced apart from the extended housing portion 431, and the connecting housing portion 421 is disposed between the basic housing portion 44 and the extended housing portion 431 and used for connecting the basic housing portion 44 to the extended housing portion 431. That is, the connecting housing portion 421 is disposed between the basic housing portion 44 and the extended housing portion 431 so as to form a gap 60 between the basic housing portion 44 and the extended housing portion 431, where the gap 60 is outside the battery pack housing 47.

When the battery pack 40 is mounted to the housing 30, the basic housing portion 44 and the extended housing portion 431 are disposed on two sides of the housing 30 and the housing 30 at least partially passes through the preceding gap 60. The battery pack 40 powers the blower 100 for a long time, and a large amount of heat is necessarily generated inside the battery pack 40, which will affect the service lives of internal components of the battery pack 40 in the long run. The basic housing portion 44 and the extended housing portion 431 are spaced apart from each other so that a heat dissipation area of the battery pack 40 can be increased, thereby facilitating the heat dissipation of the battery pack 40.

Figure 11:
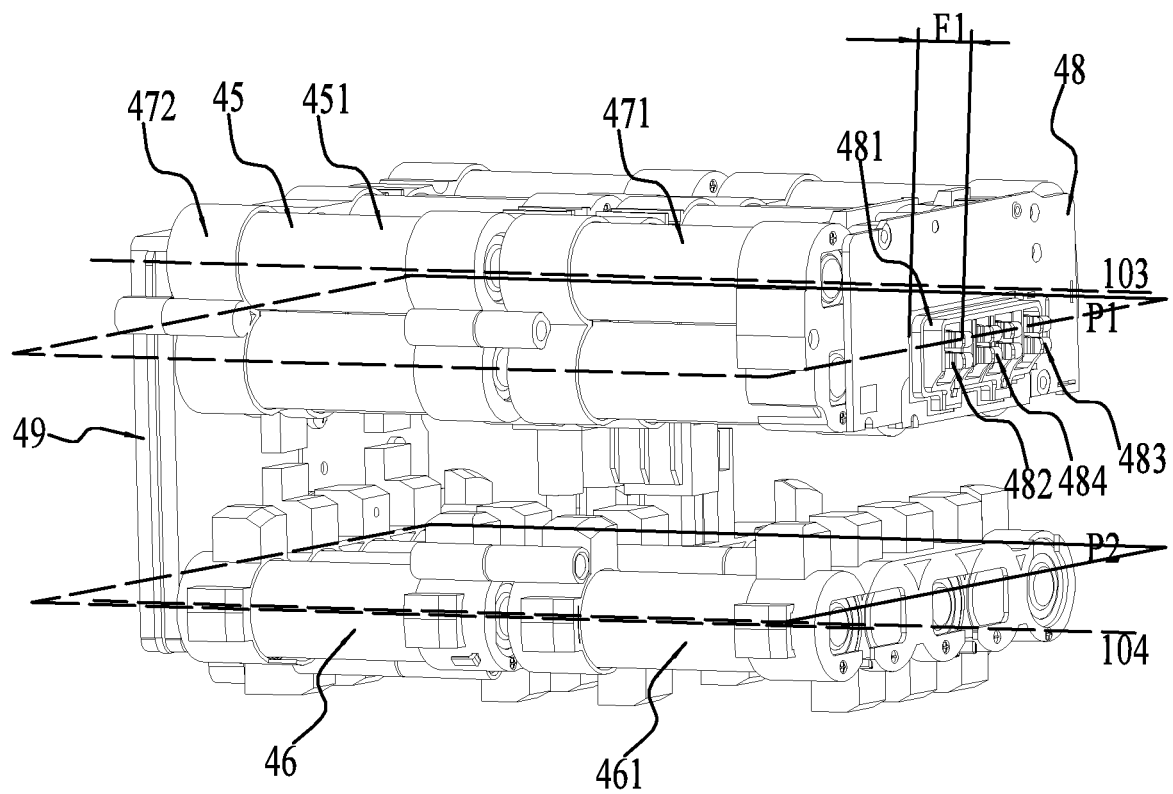
FIG. 11 is a perspective view of part of the battery pack shown in FIG. 7.
Figure 13:
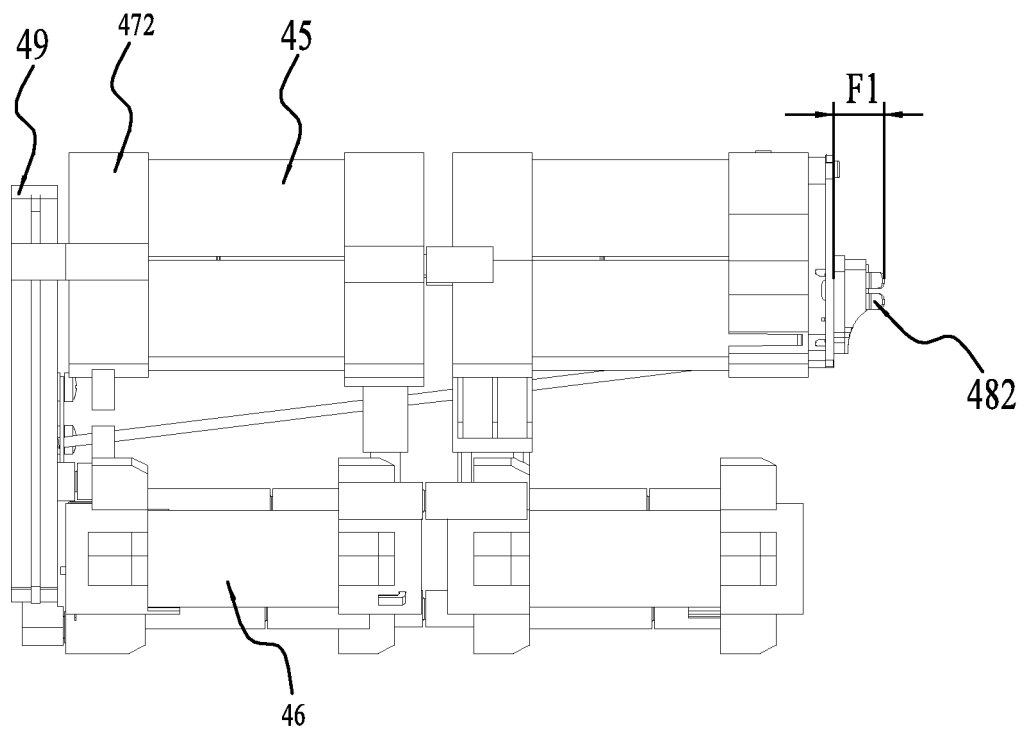
FIG. 13 is a plan view of the part of the battery pack shown in FIG. 11.

Referring to FIGS. 11 and 13, additionally, the battery pack 40 further includes a support 472, a cell assembly 471, an electrode plate terminal assembly 481, an interface circuit board 48, and a connection device 49. The support 472 is fixedly connected to or directly formed by the battery pack housing 47. The support 472 is used for supporting the cell assembly 471. It may also be understood as follows: the cell assembly 471 is fixed on the support 472, and further the cell assembly 471 is fixed in the battery pack housing 47. The cell assembly 471 includes a first cell group 45 and a second cell group 46, both of which are used for storing power. The interface circuit board 48 is fixedly mounted in the battery pack housing 47. The interface circuit board 48 is disposed at an end of the cell assembly 471 along an insertion direction of the tool terminals 361. The interface circuit board 48 is used for electrically connecting the first cell group 45 and the second cell group 46 to the electrode plate terminal assembly 481. The electrode plate terminal assembly 481 is mounted onto the interface circuit board 48 and used for electrically connecting the battery pack 40 to the tool terminals 361 of an external tool. That is, it may be understood as follows: the electrode plate terminal assembly 481 is used for connecting the tool terminals 361 on the tool body 100a, thereby supplying the power stored in the first cell group 45 and the second cell group 46 to the tool body 100a. Of course, the electrode plate terminal assembly 481 may also be used for connecting a charger to charge the first cell group 45 and the second cell group 46. The connection device 49 is electrically connected to the interface circuit board 48, where the connection device 49 and the interface circuit board 48 may be connected to each other through a connection piece, a wire, or the like having a conductive property. In this example, the connection device 49 and the interface circuit board 48 may be connected to each other through a wire 491 such that the arrangement of the internal structures of the battery pack 40 is more proper.

The first cell group 45 is disposed inside a first accommodating cavity 411 formed by the basic housing portion 44, and the second cell group 46 is disposed inside a second accommodating cavity 432 formed by the extended housing portion 431. A projection of the first cell group 45 in a plane C perpendicular to the first straight line 101 does not overlap a projection of the second cell group 46 in the plane C. That is, it may be understood as follows: the first cell group 45 and the second cell group 46 do not coincide with each other and the second cell group 46 is disposed at the upper side or the lower side of the first cell group 45 along an up-down direction parallel to the plane C.

The first cell group 45 includes multiple first cells 451, and the second cell group 46 includes multiple second cells 461, where the first cells 451 are disposed inside a first battery pack accommodating cavity 32 and the second cells 461 are disposed inside a second battery pack accommodating cavity 33 when the battery pack 40 is mounted to the housing 30. As an example, the first cell unit 451 is a cylinder centered on a first center line 103, and the second cell unit 461 is a cylinder centered on a second center line 104. A direction of the first center line 103 is parallel to a direction of the second center line 104. It may also be understood as follows: the first cells 451 and the second cells 461 are disposed in parallel in the battery pack housing 47. The direction of the first center line 103 is parallel to the direction of the first straight line 101, that is, a direction in which the first cells 451 and the second cells 461 are disposed is consistent with a direction in which the battery pack 40 is inserted into the tool body 100a. As another example, of course, the direction of the first center line and the direction of the second center line are perpendicular to each other, and the direction of the first center line is parallel to the direction of the first straight line, that is, a direction in which the first cells are disposed is parallel to the direction in which the battery pack is inserted, and a direction in which the second cells are disposed is perpendicular to the direction in which the battery pack is inserted. As another example, the direction of the first center line and the direction of the second center line are perpendicular to each other, and the direction of the first center line is perpendicular to the direction of the first straight line, that is, the direction in which the first cells are disposed is perpendicular to the direction in which the battery pack is inserted, and the direction in which the second cells are disposed is parallel to the direction in which the battery pack is inserted. As another example, the direction of the first center line and the direction of the second center line are parallel to each other, the direction of the first center line is perpendicular to the direction in which the battery pack is inserted, and the direction of the second center line is perpendicular to the direction in which the battery pack is inserted, that is, the direction in which the first cells are disposed is perpendicular to the direction in which the battery pack is inserted, and the direction in which the second cells are disposed is perpendicular to the direction in which the battery pack is inserted. In this example, preferably, the direction of the first center line 103 is parallel to the direction of the second center line 104, and the direction of the first center line 103 is parallel to the direction of the first straight line 101, that is, the direction in which the first cells 451 and the second cells 461 are disposed is parallel to the direction in which the battery pack 40 is inserted, and the first cell group 45 and the second cell group 46 are disposed in parallel in the direction perpendicular to the first straight line 101.

The first cell group 45 includes the multiple first cells 451 disposed in a first plane P1, and the second cell group 46 includes the multiple second cells 461 disposed in a second plane P2, where the first plane P1 and the second plane P2 are parallel to each other. It is to be noted that the first cell group 45 and the second cell group 46 include at least multiple first cells 451 and multiple second cells 461 respectively along the direction perpendicular to the first straight line 101. For the sake of clarity, it is now defined that along the direction perpendicular to the first straight line 101, the first cell unit 451 and the second cell unit 461 with a shortest distance between the first center line 103 and the second center line 104 are located in the first plane P1 and the second plane P2, respectively. That is, along the direction perpendicular to the first straight line 101, the first cell unit 451 and the second cell unit 461 with the shortest distance have centers located in the first plane P1 and the second plane P2. A distance between the first plane P1 and the second plane P2 is greater than or equal to 30 mm and less than or equal to 80 mm. The distance between the first plane P1 and the second plane P2 is set within the preceding proper range so that the electrical connection between the first cell group 45 and the second cell group 46 can be more reliable, and assembly and manufacturing difficulties are reduced.

Further, the first cell group 45 at least includes three or more first cells 451 disposed in the first plane P1, and the second cell group 46 at least includes three or more second cells 461 disposed in the second plane P2, where the first plane P1 and the first straight line 103 are parallel to each other or coincide with each other. Further, a ratio of the number of the first cells 451 to the number of the second cells 461 is greater than or equal to 0.3 and less than or equal to 2. That is, the user may arrange different numbers of cell units as required so that extended portions 43 with different capacities can be selected. Thus, the user has more choices. To prevent the battery pack 40 from being too long in a thickness direction, the multiple first cells 451 of the first cell group 45 may be arranged along the direction of the first center line 103. Multiple first cells 451 may be disposed in a direction perpendicular to the first center line 103. Preferably, two first cells 451 may be arranged along the direction of the first center line 103 such that the basic portion 41 can be prevented from being too long in a length direction and the thickness direction.

Figure 14:
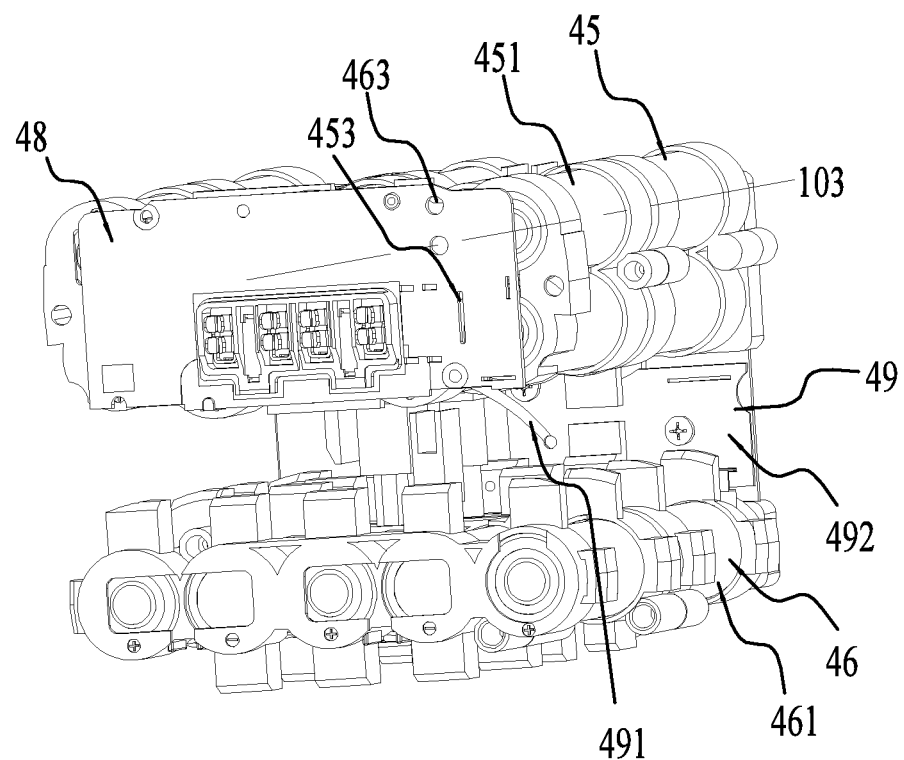
FIG. 14 is a perspective view of an arrangement manner of a cell assembly in the battery pack shown in FIG. 11.
Figure 15:
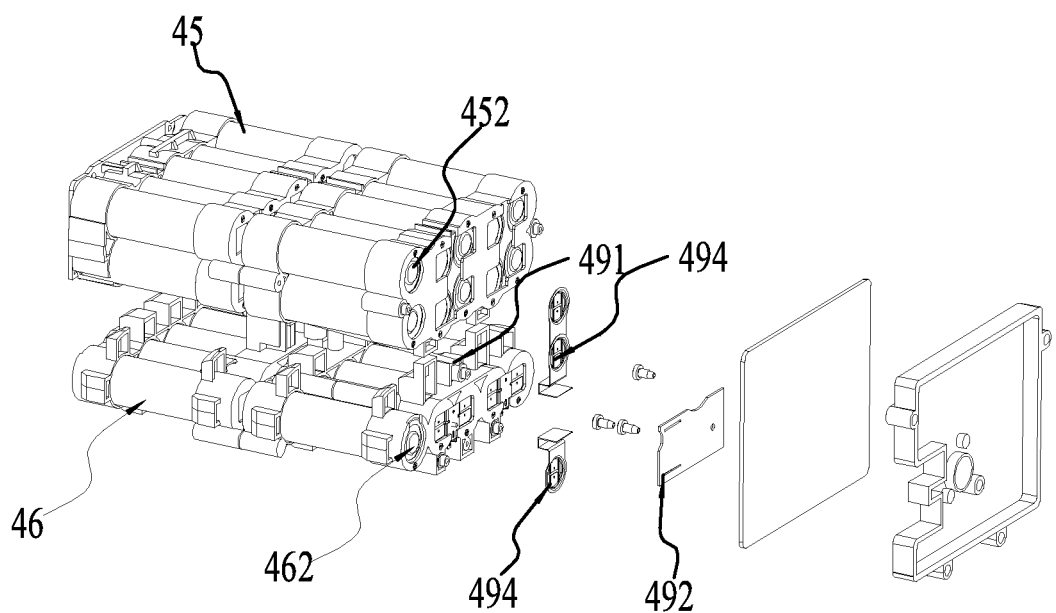
FIG. 15 is an exploded view of the arrangement manner of the cell assembly in the battery pack shown in FIG. 14.

As an example, as shown in FIGS. 14 and 15, a first positive terminal 452 and a first negative terminal 453 which are used for electrically connecting the first cell group 45 to the interface circuit board 48 are mounted on the first cell group 45. Similarly, a second positive terminal 462 and a second negative terminal 463 which are used for electrically connecting the second cell group 46 to the interface circuit board 48 are mounted on the second cell group 46. The connection device 49 electrically connects the first positive terminal 452 to the second positive terminal 462, thereby electrically connecting the first cell group 45 to the second cell group 46. In this example, the connection device 49 is disposed in the battery pack housing 47, and the interface circuit board 48 and at least part of the connection device 49 are disposed opposite to each other on two sides of the first cell group 45. It may also be understood as follows: the interface circuit board 48 and at least part of the connection device 49 are disposed at two ends of the inner space of the battery pack housing 47, separately. Specifically, the connection device 49 includes a connection plate 492 and a long electrode plate 493. The connection plate 492 is disposed at one end of the first cell group 45 and the interface circuit board 48 is disposed at the other end of the first cell group 45. Further, the connection plate 492 is connected to the first positive terminal 452 through a metal connection piece 494, and the connection plate 492 is connected to the second positive terminal 462 through a metal connection piece 494. The long electrode plate 493 electrically connects the first cell group 45 to the second cell group 46 so that the first cell group 45 and the second cell group 46 are connected in parallel. The connection plate 492 and the interface circuit board 48 are connected to each other through the wire 491 such that positive terminals of the first cell group 45 and the second cell group 46 can be connected to the interface circuit board 48 simply through one circuit, thereby simplifying a connection structure in the battery pack 40. Along the direction of the first center line 103, the long electrode plate 493 is disposed in the middle of the first cell group 45, that is, the long electrode plate 493 is not disposed at two ends of the first cell group 45. The long electrode plate 493 may be substantially disposed between first cells 451 and close to the second cell unit 461, that is, the long electrode plate 493 is disposed between the first cell unit 451 and the second cell unit 461 in the direction perpendicular to the first center line 103.

Figure 16:
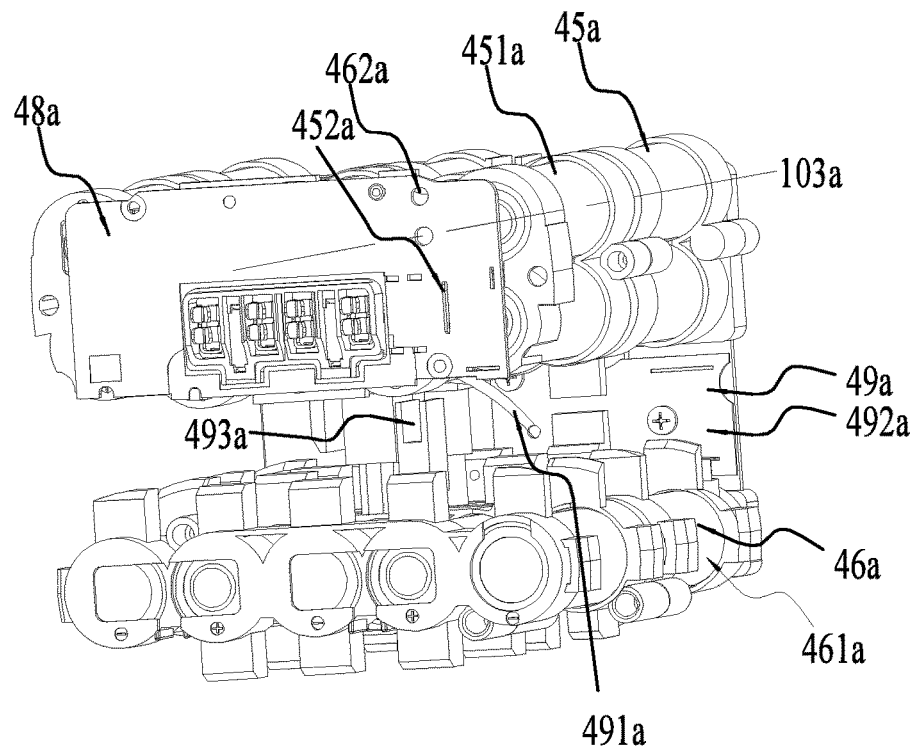
FIG. 16 is a perspective view of another arrangement manner of a cell assembly in the battery pack shown in FIG. 14.
Figure 17:
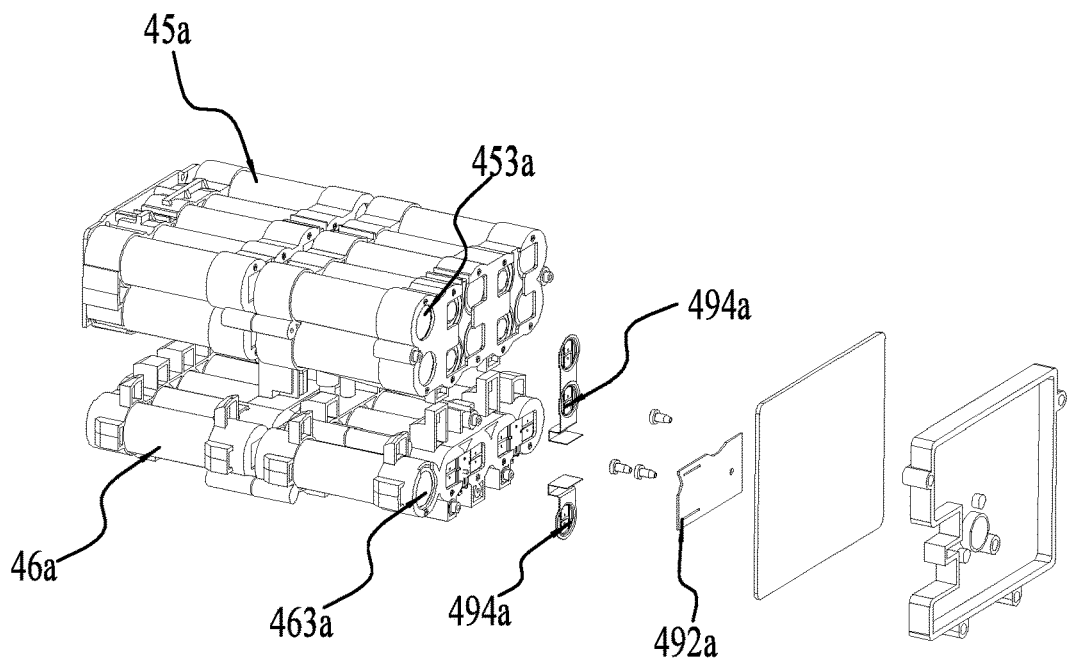
FIG. 17 is an exploded view of the arrangement manner of the cell assembly in the battery pack shown in FIG. 16.

As another example, as shown in FIGS. 16 and 17, a first positive terminal 452*a* and a first negative terminal 453*a* which are used for electrically connecting a first cell group 45*a* to an interface circuit board 48*a* are mounted on the first cell group 45*a*. Similarly, a second positive terminal 462*a* and a second negative terminal 463*a* which are used for electrically connecting a second cell group 46*a* to the interface circuit board 48*a* are mounted on the second cell group 46*a*. A connection device 49*a* electrically connects the first negative terminal 453*a* to the second negative terminal 463*a*, thereby electrically connecting the first cell group 45*a* to the second cell group 46*a*. In this example, the connection device 49*a* is disposed in the battery pack housing, and the connection device 49*a* and the interface circuit board 48*a* are disposed opposite to each other on two sides of the first cell group 45*a*. It may also be understood as follows: the connection device 49*a* and the interface circuit board 48*a* are disposed at two ends of the inner space of the battery pack housing, separately. The connection device 49*a* includes a connection plate 492*a* and a long electrode plate 493*a*. The connection plate 492*a* is disposed at one end of the first cell group 45*a* and the interface circuit board 48*a* is disposed at the other end of the first cell group 45*a*. Further, the connection plate 492*a* is connected to the first negative terminal 453*a* through a metal connection piece 494*a*, and the connection plate 492*a* is connected to the second negative terminal 463*a* through a metal connection piece 494*a*. The long electrode plate 493*a* electrically connects the first cell group 45*a* to the second cell group 46*a* so that the first cell group 45*a* and the second cell group 46*a* are connected in parallel. The connection plate 492*a* and the interface circuit board 48*a* are connected to each other through a wire 491*a* such that negative terminals of the first cell group 45*a* and the second cell group 46*a* can be connected to the interface circuit board 48*a* simply through one circuit, thereby simplifying a connection structure in the battery pack. Along a direction of a first center line 103*a*, the long electrode plate 493*a* is disposed in the middle of the first battery cell group 45*a*, that is, the long electrode plate 493*a* is not disposed at two ends of the first cell group 45*a*. The long electrode plate 493*a* may be substantially disposed between first cells 451*a* and close to the second cell unit 461*a*, that is, the long electrode plate 493 is disposed between the first cell unit 451*a* and the second cell unit 461*a* in a direction perpendicular to the first center line 103*a*.

Figure 12:
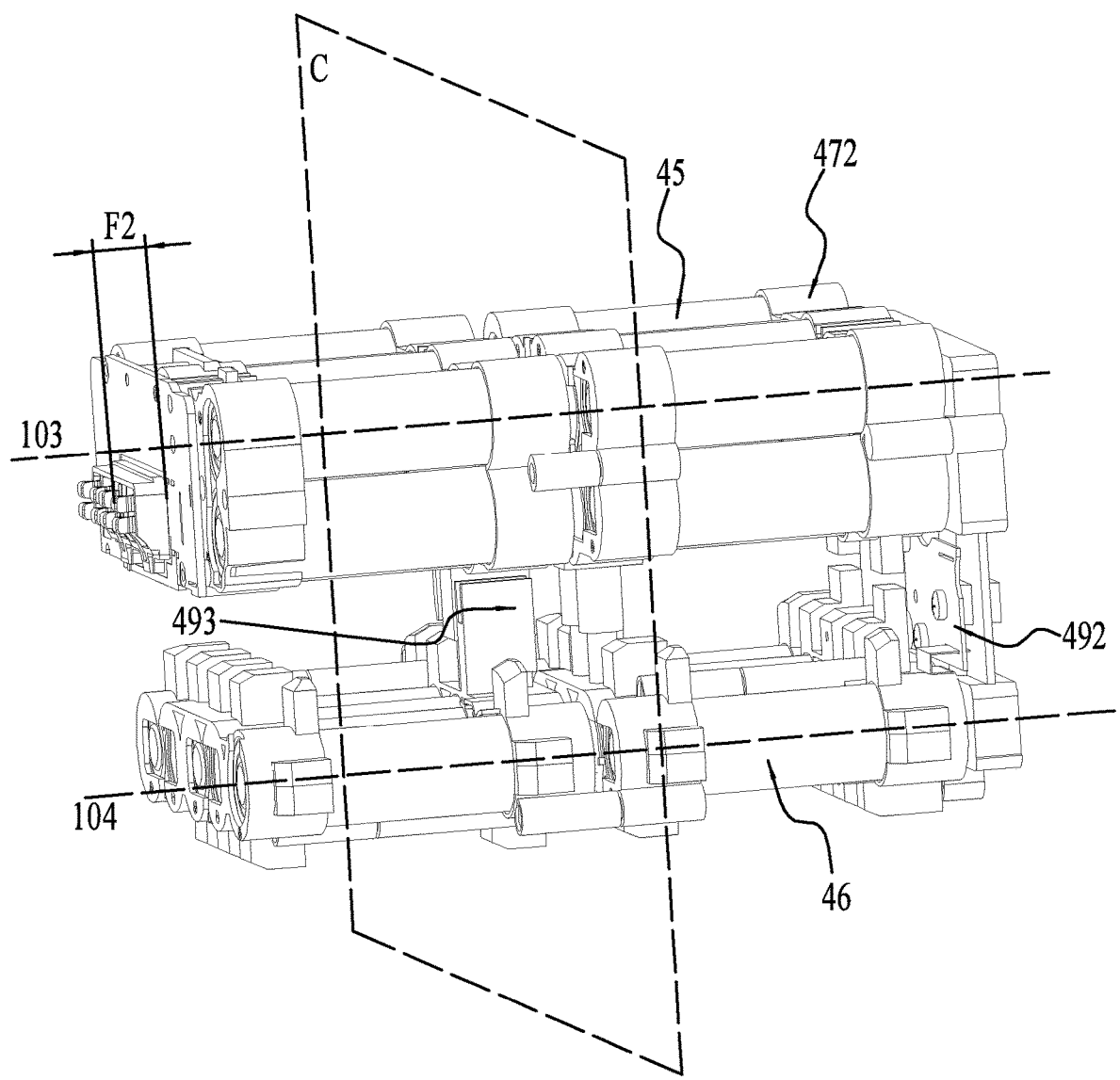
FIG. 12 is a perspective view of the part of the battery pack shown in FIG. 11 from another angle.

As shown in FIGS. 11 to 13, the electrode plate terminal assembly 481 is at least partially mounted inside the battery pack housing 47. Further, the electrode plate terminal assembly 481 is at least partially disposed inside the basic housing portion 44. The electrode plate terminal assembly 481 is used for supplying the power of the first cell group 45 and the second cell group 46 to the motor 20 in the tool body 100*a*. In this example, electrical conductivity of the electrode plate terminal assembly 481 is greater than or equal to 30% IACS and less than or equal to 100% IACS, that is, the electrical conductivity of the electrode plate terminal assembly 481 is set within the preceding range, thereby ensuring the conductive property between the electrode plate terminal assembly 481 and the tool terminals 361. Further, the electrical conductivity of the electrode plate terminal assembly 481 is greater than or equal to 50% IACS and less than or equal to 90% IACS so that the connection stability and the conductive property between the electrode plate terminal assembly 481 and the tool terminals 361 can be ensured.

The electrode plate terminal assembly 481 includes a positive terminal assembly 482, a negative terminal assembly 483, and a signal terminal assembly 484 which are mounted on the interface circuit board 48. The positive terminal assembly 482, the negative terminal assembly 483, and the signal terminal assembly 484 are fixedly connected to the interface circuit board 48. The positive terminal assembly 482 is connected to a positive electrode of the cell assembly 471, and the negative terminal assembly 483 is connected to a negative electrode of the cell assembly 471. The positive terminal assembly 482 and the negative terminal assembly 483 are in contact with the tool terminals 361 on the tool body 100*a* so that the battery pack 40 is electrically connected to external equipment. The signal terminal assembly 484 is used for connecting a tool communication terminal of the blower 100 so as to establish a communication connection between the battery pack 40 and the blower 100 so that the data communication between the battery pack 40 and the blower 100 can be implemented. Further, the positive terminal assembly 482 is used for connecting a positive connection terminal of the blower 100, and the negative terminal assembly 483 is used for connecting a negative connection terminal of the blower 100, where the positive terminal assembly 482 and the negative terminal assembly 483 are used for enabling the battery pack 40 to transmit electric energy to the blower 100. The positive terminal assembly 482, the negative terminal assembly 483, and the signal terminal assembly 484 of the electrode plate terminal assembly 481 on the interface circuit board 48 all extend in the insertion direction of the tool terminals 361. In addition, the positive terminal assembly 482, the negative terminal assembly 483, and the signal terminal assembly 484 of the electrode plate terminal assembly 481 on the interface circuit board 48 are substantially parallel to each other along a direction perpendicular to the insertion direction of the tool terminals 361. The insertion direction of the tool terminals 361 is substantially parallel to the direction of the first straight line 101. A dimension F1 of the positive terminal assembly 482 along the insertion direction of the tool terminals 361 is larger than or equal to 7 mm and smaller than or equal to 15 mm. The dimension of the positive terminal assembly 482 is set within the preceding range, which can ensure the connection stability between the positive terminal assembly 482 and the tool terminals 361 and will not cause too long a dimension of the battery pack 40 in the length direction. A dimension F2 of the negative terminal assembly 483 along the insertion direction of the tool terminals 361 is larger than or equal to 7 mm and smaller than or equal to 15 mm. Similarly, the dimension of the negative terminal assembly 483 is set within the preceding range, which can ensure the connection stability between the negative terminal assembly 483 and the tool terminals 361 and will not cause too long a dimension of the battery pack 40 in the length direction. In this example, the positive terminal assembly 482 and the negative terminal assembly 483 are substantially equal in dimension along the insertion direction of the tool terminals. Further, a communication terminal assembly and the positive terminal assembly 482 are substantially equal in dimension along the insertion direction of the tool terminals. It is to be noted that the dimension F1 of the positive terminal assembly 482 along the insertion direction of the tool terminals 361 refers to a distance from an end portion of the positive terminal assembly 482 farther from the cell assembly 471 to the interface circuit board 48 along the insertion direction of the tool terminals 361. Similarly, the dimension F2 of the negative terminal assembly 483 along the insertion direction of the tool terminals 361 has the same explanation as that of the positive terminal assembly 482.

Along a direction perpendicular to the first plane P1, a projection of the connecting housing portion 421 on the first plane P1 partially overlaps a projection of the basic housing portion 44 on the first plane P1, where a projection area of the overlapping part is less than 90% of a projection area of the basic housing portion 44 on the first plane P1, that is, the connecting housing portion 421 only intersects with the basic housing portion 44 partially. Along the direction of the first center line 103, a ratio of a dimension of the connecting housing portion 421 to a dimension of the basic housing portion 44 is greater than or equal to 0.3 and less than 1, that is, along the direction of the first center line 103, the dimension of the connecting housing portion 421 is smaller than the dimension of the basic housing portion 44. Similarly, the dimension of the connecting housing portion 421 is also smaller than a dimension of the extended housing portion 431. In the direction perpendicular to the first plane P1, the base housing section 44, the connection housing section 421, and the extension housing section 431 approximately form a recess.

As some examples, an orthographic projection of the gap 60 between the basic housing portion 44 and the extended housing portion 431 on the first plane P1 may be L-shaped, U-shaped, C-shaped, V-shaped, or the like. The shape of the orthographic projection of the gap 60 between the basic housing portion 44 and the extended housing portion 431 on the first plane P1 is not limited here as long as the gap 60 can surround the long electrode plate 493 connected between the basic portion 41 and the connecting portion 42. In this example, the orthographic projection of the gap 60 between the basic housing portion 44 and the extended housing portion 431 on the first plane P1 is U-shaped, which is not only convenient for manufacturing but also easy for the user to mount the battery pack 40. Further, the basic housing portion 44 includes a first basic surface 441 and a second basic surface 442 opposite to each other. The extended housing portion 431 includes a first extension surface 4311 and a second extension surface 4312 opposite to each other. The first basic surface 441 is adjacent to the first extension surface 4311 in the direction perpendicular to the first plane P1, and the first basic surface 441 and the first extension surface 4311 are each at least partially connected to the connecting housing portion 421. A distance H1 between the first basic surface 441 and the first extension surface 4311 in the direction perpendicular to the first plane P1 is greater than or equal to 2 mm and less than or equal to 20 mm. It may also be understood as follows: the thickness of the gap 60 is greater than or equal to 2 mm and less than or equal to 20 mm. The thickness of the gap 60 is set within the preceding range. On the one hand, in this manner, it can be ensured that the connection plate 492 and the long electrode plate 493 which are used for connecting the first cell group 45 to the second cell group 46 are not too long so that the electrical connection between the basic housing portion 44 and the extended housing portion 431 is more reliable, and the assembly difficulty of the battery pack 40 is also reduced. On the other hand, in this manner, heat dissipation areas of the basic portion 41 and the extended portion 43 are increased, thereby facilitating the heat dissipation of the battery pack 40.

A dimension H2 of the gap 60 in a width direction perpendicular to the first center line 103 and parallel to the first plane P1 is greater than or equal to 30 mm and less than or equal to 200 mm. The width of the gap 60 is set within the preceding range, which not only can stabilize the connection between the basic housing portion 44 and the extended housing portion 431 but also is convenient for the user to mount the battery pack 40 onto the housing 30.

To clearly illustrate the technical solutions of the present application, a left side, a right side, an upper side, a lower side, a front side, and a rear side in the present application are shown in FIG. 1 and refer to six orientations of the battery pack 40 in the direction perpendicular to or parallel to the first straight line 101 when the battery pack 40 is mounted onto a battery pack accommodating portion 31. That is to say, referring to FIGS. 1 and 7, the first straight line 101 in which the battery pack 40 is coupled to the accommodating portion 31 is the front side, and the side where the first base surface 441 is located is the upper side.

Figure 4:
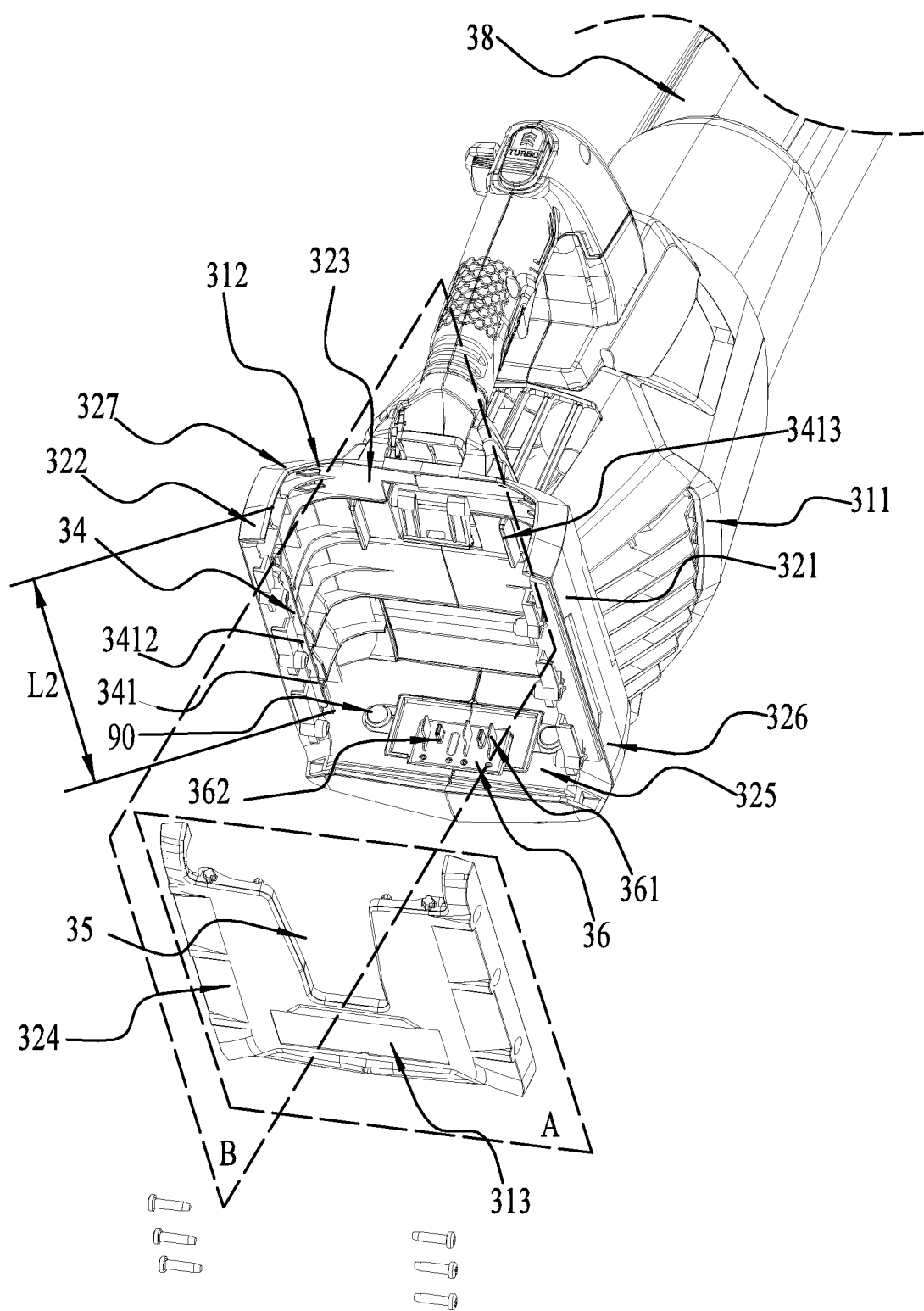
FIG. 4 is an exploded view of part of a tool body of the blower shown in FIG. 1.

Referring to FIGS. 3 and 4, the housing 30 is fixedly connected to the battery pack accommodating portion 31, or the housing 30 and the battery pack accommodating portion 31 are integrally formed. In the present application, the battery pack accommodating portion 31 and the housing 30 are integrally formed. The battery pack accommodating portion 31 includes the first battery pack accommodating cavity 32 and the second battery pack accommodating cavity 33. The basic portion 41 is at least partially disposed inside the first battery pack accommodating cavity 32, and the extended portion 43 is at least partially disposed inside the second battery pack accommodating cavity 33 when the battery pack 40 is mounted to the battery pack accommodating portion 31. That is, the first cell group 45 is at least partially disposed inside the first battery pack accommodating cavity 32, and the second cell group 46 is at least partially disposed outside the first battery pack accommodating cavity 32. In this example, the second cell group 46 is at least partially disposed inside the second battery pack accommodating cavity 33. In this manner, the battery packs 40 with different capacities can be mounted to the battery pack accommodating portion 31 according to requirements of the user, which offers more choices to the user and is more convenient for the user. In addition, the capacity of the extended portion 43 of the battery pack 40 can be extended without limit according to the requirements of the user, which can effectively improve the endurance of the blower 100, prolong the working time of the blower 100, and facilitate operation by the user because the user does not need to frequently replace the battery pack 40. In the present application, the second battery pack accommodating cavity 33 may be understood as an external space.

The first battery pack accommodating cavity 32 includes a first sidewall 321, a second sidewall 322, a third sidewall 323, a fourth sidewall 324, and a bottom wall 325. That is, the first battery pack accommodating cavity 32 is surrounded and formed by the preceding four sidewalls and bottom wall 325. Specifically, when the battery pack 40 is mounted to the battery pack accommodating portion 31, the first sidewall 321 is disposed on a right side of the battery pack 40; the second sidewall 322 is disposed opposite to the first sidewall 321, that is, the second sidewall 322 is disposed on a left side of the battery pack 40; the third sidewall 323 is disposed on an upper side of the battery pack 40; and the fourth sidewall 324 is disposed opposite to the third sidewall 323, that is, the fourth sidewall 324 is disposed on a lower side of the battery pack 40. An outer wall of the fourth sidewall 324 defines a limit plane A parallel to the first straight line 101, where the basic portion 41 and the extended portion 43 of the battery pack 40 are disposed on two sides of the limit plane A, separately. Further, the basic portion 41 is disposed inside the first battery pack accommodating cavity 32, and the extended portion 43 is disposed outside the first battery pack accommodating cavity 32. It may be understood as follows: the basic portion 41 is disposed on a side of the fourth sidewall 324 facing towards the third sidewall 323, and the extended portion 43 is disposed on a side of the fourth sidewall 324 facing away from the third sidewall 323. In this manner, the battery packs 40 with different capacities can be connected without completely resetting the battery pack accommodating portion 31. Additionally, in this manner, the battery capacity of the extended portion 43 outside the first battery pack accommodating cavity 32 may not be limited by a structure so that the capacity of the extended portion 43 can be extended without limit, thereby improving the performance and endurance of the blower 100. It is to be noted that the sidewalls here are not limited to planes. In addition, it is to be noted that the fourth sidewall 324 may not be limited to only one component. A part of the fourth sidewall 324 may be fixedly connected to the first sidewall 321 or may be directly formed by the first sidewall 321 extending into the first battery pack accommodating cavity 32. The other part of the fourth sidewall 324 may be fixedly connected to the second sidewall 322 or may be directly formed by the second sidewall 322 extending into the first battery pack accommodating cavity 32. That is, the fourth sidewall 324 may be constituted by two components. The lengths of the part and the other part of the fourth sidewall 324 in a direction which is parallel to or coincides with the limit plane A are not limited here, that is, the length of the fourth sidewall 324 may be equal to 0 mm, that is, there is no third housing portion 313. In this manner, the first battery pack accommodating cavity 32 formed by the first sidewall 321, the second sidewall 322, the third sidewall 323, and the bottom wall 325 is substantially semi-enclosed and U-shaped. As another example, of course, the fourth sidewall 324 may also be constituted by multiple components. In this example, the fourth sidewall 324 is one component.

In this example, the housing 30 includes a first housing portion 311, a second housing portion 312, and a third housing portion 313, where the first housing portion 311 forms the first sidewall 321, the second housing portion 312 forms the second sidewall 322, the third sidewall 323 and the bottom wall 325 are each formed by part of the first housing portion 311 and part of the second housing portion 312 together, and the fourth sidewall 324 is formed by the third housing portion 313. It may also be understood as follows: the first sidewall 321 and a part of the third sidewall 323 are integrally formed as a first integral piece 326, and the second sidewall 322 and the other part of the third sidewall 323 are integrally formed as a second integral piece 327, where the first integral piece 326 is detachably connected to the second integral piece 327, the fourth sidewall 324 connects the first integral piece 326 to the second integral piece 327, and the fourth sidewall 324 is detachably connected to the first integral piece 326 and the second integral piece 327. It is to be noted that the detachable connection refers to causing a component to be detached from an original structure without damaging the original structure, and the detachable connection here refers to that the first integral piece 326 and the second integral piece 327 are detached from each other without damaging their original structures. That is, a snap-fit connection, a threaded connection, a connection through screws 315, or the like may be used between the first housing portion 311 and the second housing portion 312 as long as the first housing portion 311 and the second housing portion 312 are not separated from each other during normal working. In the example, the first housing portion 311 and the second housing portion 312 are connected through the screws 315. Similarly, the snap-fit connection, the threaded connection, the connection through screws 315, or the like may be used between the fourth sidewall 324 and the first integral piece 326 and/or the second integral piece 327. In this example, the fourth sidewall 324 is detachably connected to the second sidewall 322. Specifically, the fourth sidewall 324 is connected to the second sidewall 322 through the screws 315. To ensure the connection stability, one side of the fourth sidewall 324 is detachably connected to the second sidewall 322, and the other side of the fourth sidewall 324 is detachably connected to the first sidewall 321. That is, the fourth sidewall 324 is fixed to the second sidewall 322 through the screws 315, and the fourth sidewall 324 is fixed to the first sidewall 321 through the screws 315. Thus, after the battery pack 40 is mounted to the battery pack accommodating portion 31, the battery pack 40 is prevented from being separated from the battery pack accommodating portion 31 because of shakes when the motor 20 is working. Moreover, when a component inside the first battery pack accommodating cavity 32 fails, the fourth sidewall 324 can be easily removed by the user, thereby facilitating maintenance by the user. Further, to improve the structural strength of the first battery pack accommodating cavity 32, reinforcement ribs may be disposed on the sidewalls.

Figure 5:
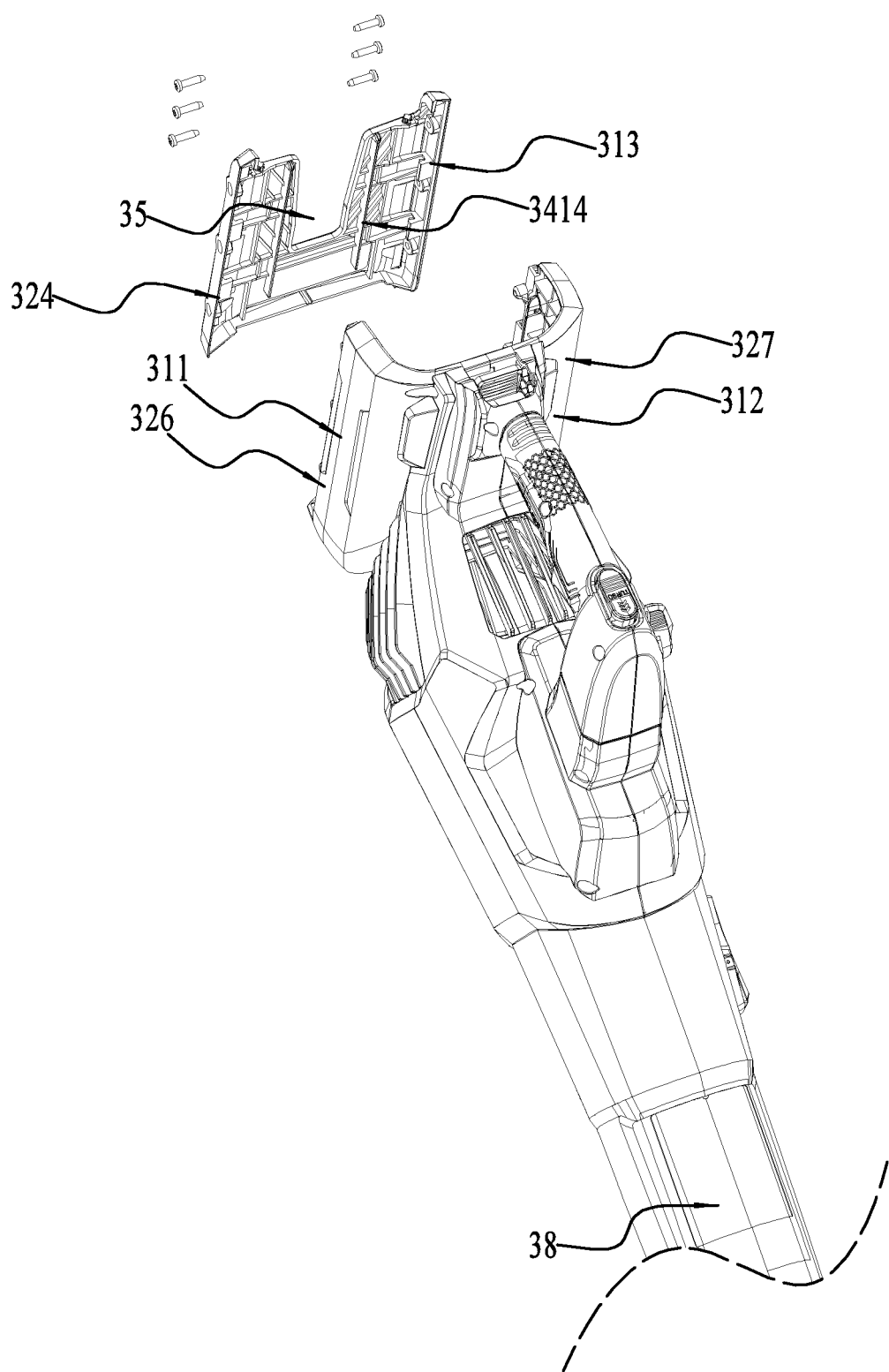
FIG. 5 is an exploded perspective of part of the tool body of the blower shown in FIG. 4 from another angle.
Figure 6:
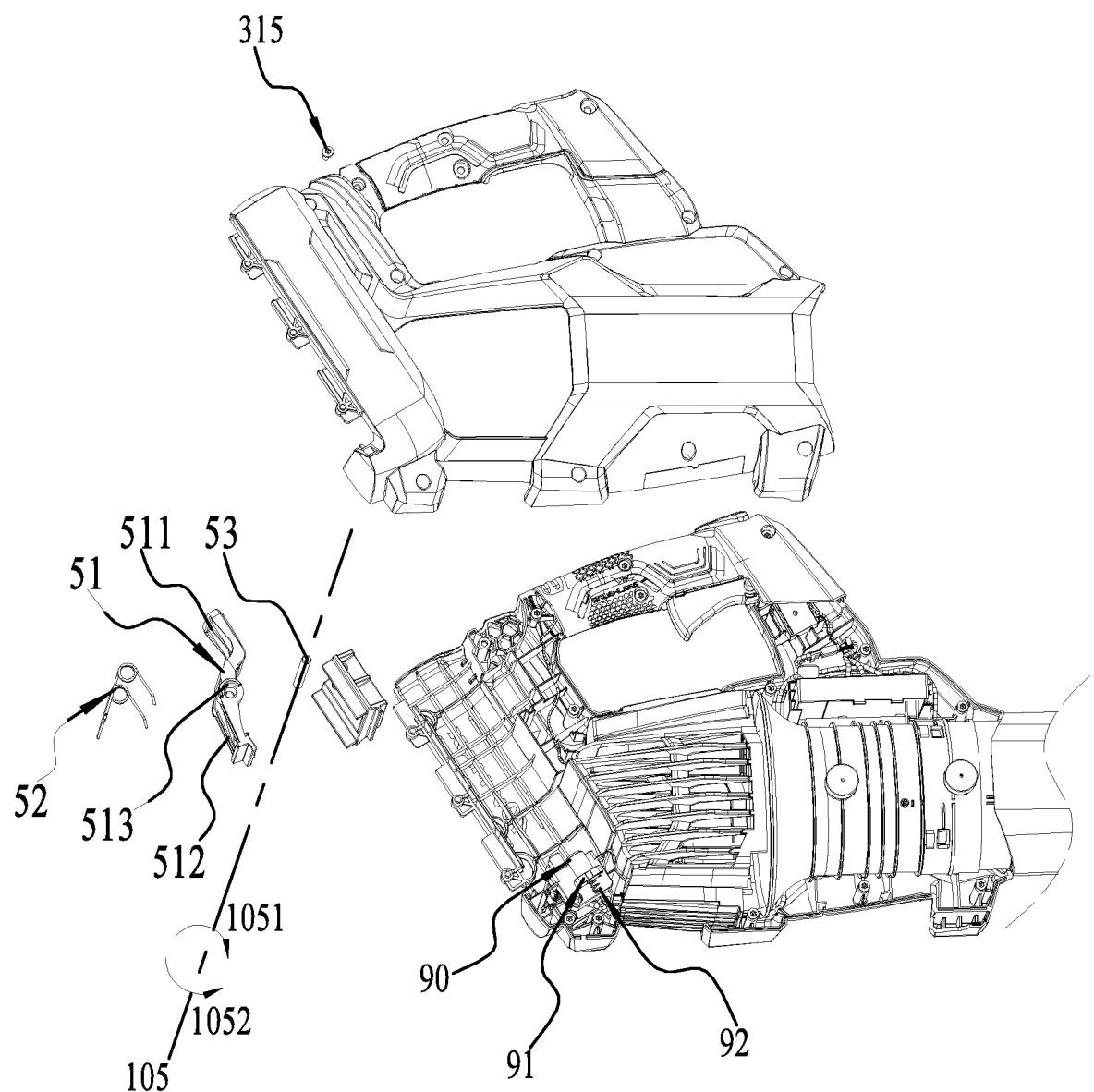
FIG. 6 is an exploded view of part of a tool body of the blower shown in FIG. 1.
Figure 7:
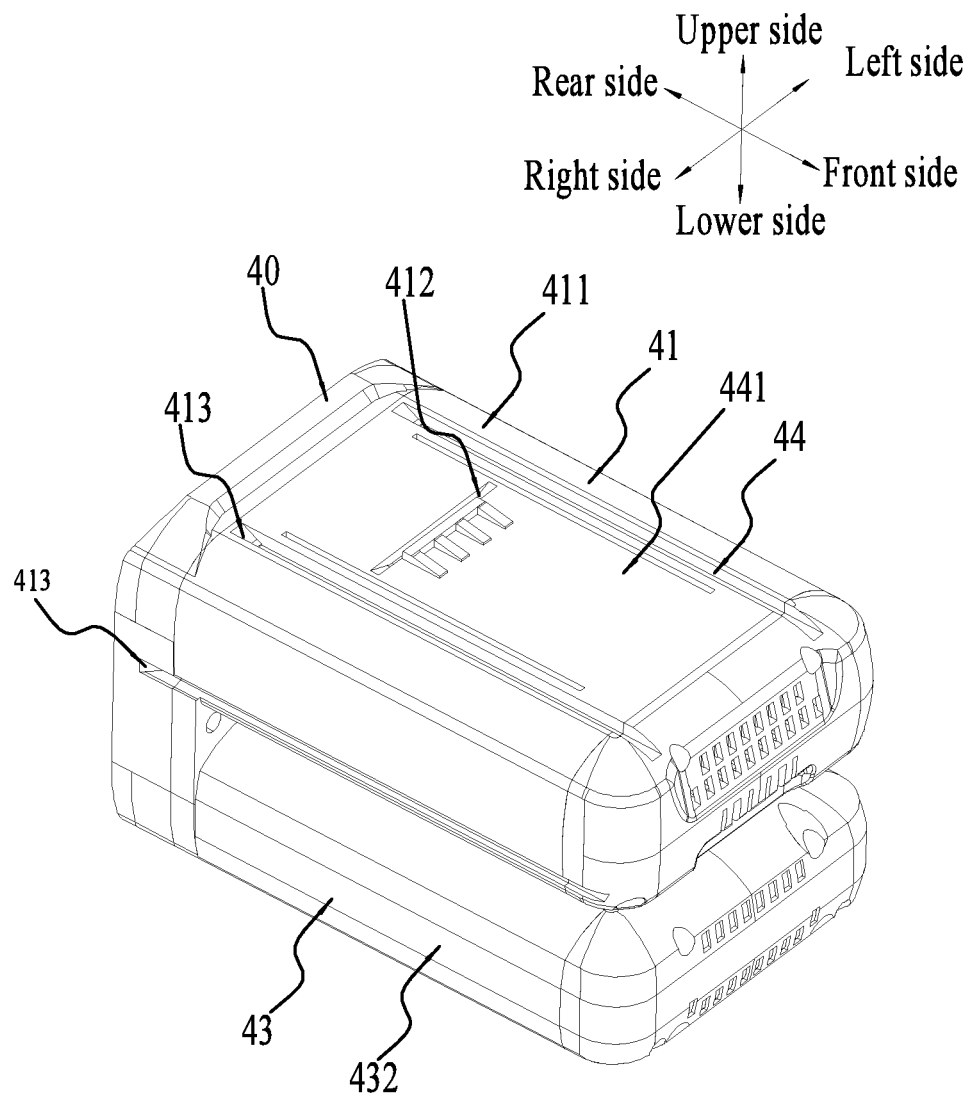
FIG. 7 is a perspective view of a battery pack of the blower shown in FIG. 1.
Figure 8:
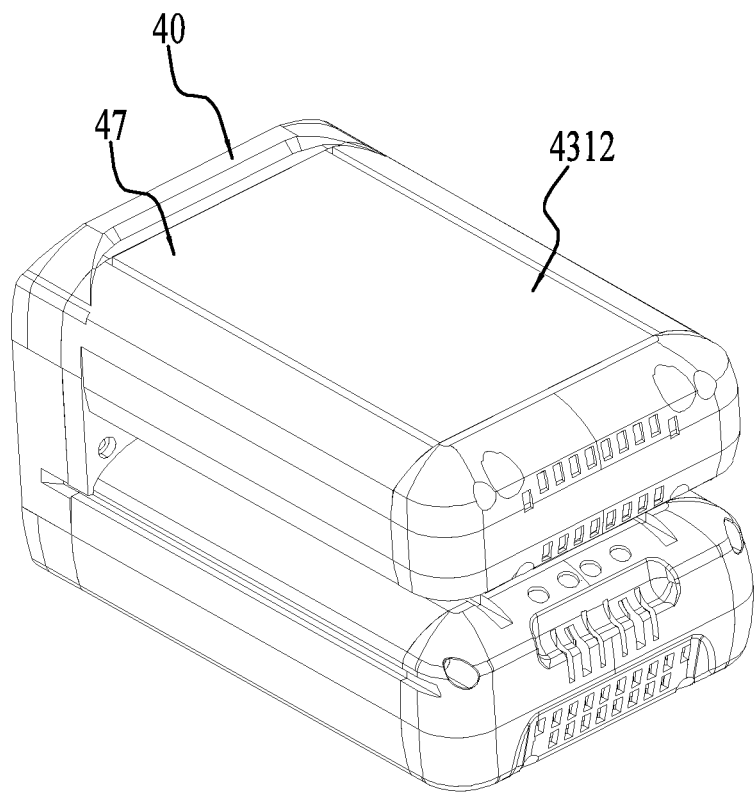
FIG. 8 is a perspective view of the battery pack shown in FIG. 7 from another angle.
Figure 9:
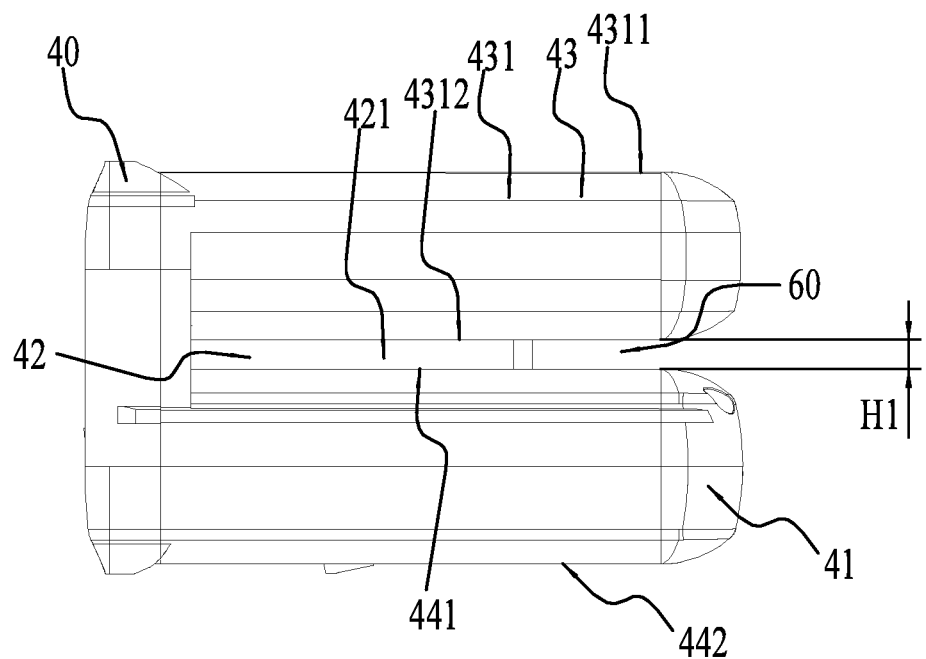
FIG. 9 is a plan view of the battery pack shown in FIG. 7.
Figure 10:
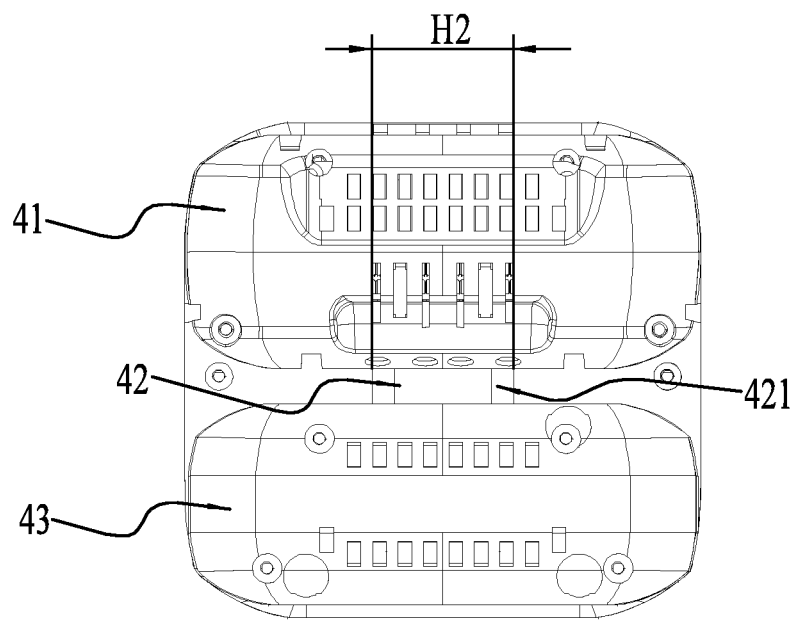
FIG. 10 is a plan view of the battery pack shown in FIG. 7.

Referring to FIG. 5 as well, the blower 100 further includes a midplane B perpendicular to the limit plane A. The fourth sidewall 324 is symmetrical about the midplane B. In this example, the first sidewall 321 is disposed on a left side of the midplane B, and the second sidewall 322 is disposed on a right side of the midplane B. It is to be noted that the fourth sidewall 324 being symmetrical about the midplane B in the present application is not strictly limited to the fourth sidewall 324 being completely identical on the left and right sides of the midplane B. It may be understood as the fourth sidewall 324 being symmetrical about the midplane B as long as an error is within an allowable range. The fourth sidewall 324 is disposed between the first battery pack accommodating cavity 32 and the second battery pack accommodating cavity 33, where the fourth sidewall 324 is provided with an opening 35 through which the first battery pack accommodating cavity 32 communicates with the second battery pack accommodating cavity 33, and the midplane B passes through the preceding opening 35. It may also be understood as follows: the opening 35 penetrates through the battery pack accommodating portion 31. That is, the opening 35 formed on the fourth sidewall 324 penetrates through the first battery pack accommodating cavity 32 and the second battery pack accommodating cavity 33 along a direction of a second straight line 102, and the opening 35 opens toward a direction away from the bottom wall 325 along the direction of the first straight line 101. When the battery pack 40 is mounted to the battery pack accommodating portion 31, the connecting housing portion 421 for connecting the extended portion 43 to the basic portion 41 passes through the preceding opening 35, that is, the opening 35 guides the battery pack 40 to be coupled to the first battery pack accommodating cavity 32. With the preceding arrangement, it is convenient for the user to mount the battery pack 40 into the battery pack accommodating portion 31. In the present application, the first straight line 101 is perpendicular to the second straight line 102.

Further, a ratio of a dimension of the opening 35 along the direction of the first straight line 101 to a dimension of the first battery pack accommodating cavity 32 along the direction of the first straight line 101 is less than 1. It is to be noted that the dimension of the first battery pack accommodating cavity 32 along the direction of the first straight line 101 refers to a dimension from the bottom wall 325 to an end of the sidewall farthest from the bottom wall 325 along the direction of the first straight line 101. A distance of the opening 35 along the direction of the first straight line 101 refers to a dimension from the end of the sidewall farthest from the bottom wall 325 along the direction of the first straight line 101 to an end of the opening 35 closest to the bottom wall 325 along the direction of the first straight line 101. Specifically, the ratio of the dimension L1 of the opening 35 along the direction of the first straight line 101 to the dimension L2 of the first battery pack accommodating cavity 32 along the direction of the first straight line 101 is greater than or equal to 0.3 and less than 1. In this example, the opening 35 can guide the connecting housing portion 421 of the battery pack 40 to be slidably inserted into the first battery pack accommodating cavity 32 along the direction of the first straight line 101. That is, in a direction perpendicular to the first straight line 101 and parallel to the limit plane A, a dimension of the opening 35 should be greater than a dimension of the connecting housing portion 421, and the connecting housing portion 421 should be adjacent to the opening 35 when the battery pack 40 is mounted onto the accommodating cavity of the battery pack 40. The dimension of the opening 35 and a dimension of the first accommodating cavity 411 are set within the preceding ranges so that an enough space is provided for the connecting housing portion 421 of the battery pack 40 to move.

In some other examples, the ratio of the dimension L1 of the opening 35 along the direction of the first straight line 101 to the dimension of the first battery pack accommodating cavity 32 along the direction of the first straight line 101 is greater than or equal to 0.4 and less than or equal to 0.9. In some other examples, the ratio of the dimension of the opening 35 along the direction of the first straight line 101 to the dimension of the first battery pack accommodating cavity 32 along the direction of the first straight line 101 is greater than or equal to 0.6 and less than or equal to 0.8. The connecting housing portion 421 is adjacent to the opening 35, the ratio of the dimension of the opening 35 along the direction of the first straight line 101 to the dimension of the first battery pack accommodating cavity 32 along the direction of the first straight line 101 is set within the preceding range, and it may also be understood as follows: a distance from the connecting housing portion 421 to the bottom wall 325 of the first battery pack accommodating cavity 32 is substantially within the preceding range. In this manner, the connection between the basic portion 41 and the extended portion 43 can be more stable. In addition, since the connecting housing portion 421 for connecting the basic portion 41 to the extended portion 43 is disposed in the opening 35, the battery pack 40 can be prevented from arbitrarily swaying in the accommodating cavity of the battery pack 40 even in the case of vigorous shakes.

As shown in FIGS. 2 to 7, the blower 100 further includes a locking assembly 50 disposed on the third sidewall 323. The locking assembly 50 is used for locking the battery pack 40 into the first battery pack accommodating cavity 32. It may also be understood as follows: the locking assembly 50 includes at least a first state (as shown in FIG. 2) and a second state (as shown in FIG. 3). When the locking assembly 50 is in the first state, the battery pack 40 remains fixed relative to the first battery pack accommodating cavity 32. When the locking assembly 50 is in the second state, the battery pack 40 can be separated from the first battery pack accommodating cavity 32.

The locking assembly includes an operation member 51, a biasing member 52, and a connection shaft 53. The operation member 51 can be driven to rotate about a first axis 105, where the operation member 51 includes at least a locking position (as shown in FIG. 2), a release position (as shown in FIG. 3), and an initial position (as shown in FIG. 4) during rotation. The initial position refers to a position where the operation member 51 without being driven by an external force is located when the battery pack 40 is not mounted onto the housing 30. When the operation member 51 is rotated about the first axis 105 along a first direction 1051 from the release position to the locking position, the battery pack 40 is fixed relative to the housing 30, that is, the locking assembly 50 is in the first state. When the operation member 51 is rotated about the first axis 105 along a second direction 1052 from the locking position to the release position, the battery pack 40 can move relative to the housing 30, that is, the locking assembly 50 is in the second state. The biasing member 52 is used for biasing the operation member 51, that is, the biasing member 52 is mounted with a biasing force. Thus, the operation member 51 is rotated about the first axis 105 along the first direction 1051 without the influence of the external force. That is, without the external force, the operation member 51 will be in the initial position due to the biasing force. When the user mounts the battery pack 40 onto the tool body 100a, the user needs to apply a force against the preceding biasing force to rotate the operation member 51 to the release position. The connection shaft 53 is mounted on the housing 30, and both the operation member 51 and the biasing member 52 are sleeved on the connection shaft 53. An operation portion 511, a locking portion 512, and a middle portion 513 for connecting the operation portion 511 to the locking portion 512 are fixedly connected to or integrally formed on the operation member 51. The operation portion 511 and the locking portion 512 are disposed at two ends of the operation member 51 and move synchronously with the operation member 51. The operation portion 511 is operated by the user, that is, the user rotates the operation member 51 by driving the operation portion 511. The locking portion 512 mates with the battery pack 40 to implement locking and release. Further, a slot portion 412 disposed on an upper surface of the battery pack 40 can be engaged with the locking portion 512, thereby implementing locking. The battery pack 40 is released when the slot portion 412 is separated from the locking portion 512. In this example, the operation portion 511, the locking portion 512, and the operation member 51 are integrally formed. In a direction perpendicular to the limit plane A, a cross section of the operation member 51 is substantially Z-shaped. That is, in the direction perpendicular to the limit plane A, the operation portion 511 of the operation member 51 is higher than the locking portion 512, that is, the middle portion 513 connects the operation portion 511 to the locking portion 512 in an inclined manner. That is, in the direction perpendicular to the limit plane A, a bypass space 314 is formed between the operation portion 511, the first housing portion 311, and the second housing portion 312 for disposing the screws 315 fixedly connecting the first housing portion 311 to the second housing portion 312.

The tool body 100a further includes a terminal block 36 on the bottom wall 325 and a resilient assembly 90 adjacent to the terminal block 36. The terminal block 36 is fixedly connected to the housing 30, and the tool terminals 361 and a positioning column 362 are fixedly connected to the terminal block 36. The tool terminals 361 are used for connecting the battery pack 40 so that the battery pack 40 powers the tool body 100*a*. Specifically, the tool terminals 361 are electrically connected to the electrode plate terminal assembly 481 of the battery pack 40. The positioning column 362 is fixedly connected to the terminal block 36, or the positioning column 362 and the terminal block 36 are integrally formed. The positioning column 362 is used for guiding the battery pack 40 to be mounted to the locking position along the direction of the first straight line 101. Two or more tool terminals 361 extending along the direction of the first straight line 101 are at least disposed on the terminal block 36, that is, an extension direction of the positioning column 362 is substantially consistent with an extension direction of the tool terminals 361. Along the direction of the first straight line 101, a length of a portion of the tool terminal 361 protruding from the terminal block 36 is greater than a length of a portion of the positioning column 362 protruding from the terminal block 36, that is, the tool terminal 361 is higher than the positioning column 362. With the preceding arrangement, when the battery pack 40 is slidably mounted to the locking position along the direction of the straight line 101, the tool terminals 361 are firstly inserted into the electrode plate terminal assembly 481 of the battery pack 40. That is, the tool terminals 361 are aligned with an electrode plate terminal assembly 481, and then the battery pack 40 is finally mounted to the locking position by being guided by the positioning column 362. The hardness of both the tool terminals 361 and the electrode plate terminal assembly 481 of the battery pack 40 is less than the hardness of the positioning column 362, which is convenient for the user to better insert the tool terminals 361 into the electrode plate terminal assembly 481, thereby avoiding ignition caused by the misalignment between the tool terminals 361 and the electrode plate terminal assembly 481 after the positioning column 362 is aligned. In addition, the positioning column 362 has greater hardness than the tool terminals 361, which can ensure the connection stability between the battery pack 40 and the terminal block 36 and avoid the separation between terminals or the deformation of terminals due to shakes when the tool is working.

The resilient assembly 90 resiliently abuts against the battery pack 40. On the one hand, the resilient assembly 90 is used for supporting the battery pack 40. On the other hand, when the battery pack 40 is released from the battery pack accommodating portion 31, the resilient assembly 90 applies a force on the battery pack 40 to move the battery pack 40 to the rear side, thereby ejecting the battery pack 40. The resilient assembly 90 includes a support element 91 and a resilient element 92. The support element 91 is used for abutting against the battery pack housing 47 when the battery pack 40 is mounted to the locking position. The resilient element 92 is used for abutting against the support element 91. Specifically, the support element 91 is provided with a support portion protruding toward the first battery pack accommodating cavity 32 substantially along the direction of the first straight line 101. The resilient element 92 is at least partially disposed inside the support element 91. One end of the resilient element 92 is fixed onto the housing 30, and the other end of the resilient element 92 abuts against the support element 91. When the battery pack 40 is in the locking position, along the direction of the first straight line 101, a length of a portion of the support element 91 protruding from the terminal block 36 is less than the length of the portion of the positioning column 362 protruding from the terminal block 36, and a distance from the support element 91 to the bottom wall 325 is greater than 0 mm. That is, when the battery pack 40 is mounted in place, the battery pack housing 47 is in contact with the support element 91, and an interval exists between the battery pack housing 47 and the terminal block 36. When the user selects a large-capacity battery pack 40 as required, since the battery pack 40 is heavy, the battery pack housing 47 easily damages the terminal block 36 when the battery pack 40 is mounted to the first battery pack accommodating cavity 32. With the preceding arrangement, the impact force brought by the battery pack 40 is buffered with the property of the resilient element 92, so as to prevent the terminal block 36 from being damaged and prolong the service life of the terminal block 36. In addition, when the battery pack 40 is released, a deformation force generated by the resilient element 92 due to the battery pack 40 moves the battery pack 40 along a direction opposite to the insertion direction, thereby facilitating the removal of the battery pack 40 by the user.

The battery pack accommodating portion 31 is configured for the battery pack 40 to be at least partially inserted into along the direction of the first straight line 101. It may be understood as follows: the battery pack 40 may be inserted into the battery pack accommodating portion 31 along the direction of the first straight line 101. In this example, a guide structure 34 is disposed on the battery pack accommodating portion 31 for guiding the battery pack 40 to be inserted into the battery pack accommodating portion 31 along the direction of the first straight line 101. The guide structure 34 is disposed inside the first battery pack accommodating cavity 32 and adjacent to end portions of the sidewalls. Specifically, the guide structure 34 is disposed on the sidewalls of the first battery pack accommodating cavity 32. The guide structure 34 includes at least a pair of opposite guide ribs 341. The guide ribs 341 are defined here as a first guide rib 3411 and a second guide rib 3412. The first guide rib 3411 is fixedly connected to the first sidewall 321, or the first guide rib 3411 and the first sidewall 321 are integrally formed. The second guide rib 3412 is fixedly connected to the second sidewall 322, or the second guide rib 3412 and the second sidewall 322 are integrally formed. In this example, the guide ribs 341 and the sidewalls are integrally formed, that is, the first guide rib 3411 protruding toward the first battery pack accommodating cavity 32 is formed on the first sidewall 321, and the second guide rib 3412 protruding toward the first battery pack accommodating cavity 32 is formed on the second sidewall 322. The guide ribs 341 are disposed on the first sidewall 321 and the second sidewall 322, which not only facilitates the mounting of the battery pack 40 but also positions the battery pack 40 on the left and right sides, thereby preventing the battery pack 40 from swaying in the first battery pack accommodating cavity 32. The first guide rib 3411 and the second guide rib 3412 include multiple discontinuous positioning protrusions. Guide grooves 413 corresponding to the guide ribs 341 are formed on the basic housing portion 44 of the battery pack 40. The battery pack housing 47 is recessed inward along the length direction of the battery pack 40 so as to form the guide grooves 413. The guide grooves 413 on the battery pack 40 mate with the positioning protrusions to position the battery pack 40. Multiple protrusions are disposed on the guide ribs 341 so that positioning problems caused by the deformation of the guide ribs 341 can be effectively avoided. It is to be noted that a length by which the guide rib 341 extends substantially along the direction of the first straight line 101 is not limited here.

Further, opposite guide ribs 341 are fixedly connected to the fourth sidewall 324 and the third sidewall 323, or the opposite guide ribs 341 are integrally formed on the fourth sidewall 324 and the third sidewall 323, so as to position the battery pack 323 on the upper and lower sides. Specifically, a third guide rib 3413 is disposed on the third sidewall 323, and a fourth guide rib 3414 is disposed on the fourth sidewall 324. The fourth guide rib 3414 is formed on the fourth sidewall 324, and the third guide rib 3413 is fixedly connected to the third sidewall 323. That is, the third guide rib 3413 may be separated from the third sidewall 323, and the third guide rib 3413 is a separate component, which facilitates the demoulding of the first housing portion 311 and the second housing portion 312.

The above illustrates and describes basic principles, main features, and advantages of the present disclosure. It is to be understood by those skilled in the art that the preceding examples do not limit the present disclosure in any form, and technical solutions obtained by means of equivalent substitutions or equivalent transformations fall within the scope of the present disclosure.

What is claimed is:

1. A power tool, comprising:
    an output member for outputting power;
    a motor for driving the output member;
    a housing; and
    a battery pack for powering the motor,
    wherein the housing comprises:
        a battery pack accommodating portion provided with a first battery pack accommodating cavity and a guide structure for guiding the battery pack to be inserted into the first battery pack accommodating cavity along a first straight line,
    wherein the battery pack comprises:
        a basic housing portion provided with a first accommodating cavity;
        a first cell group disposed inside the first accommodating cavity;
        an extended housing portion provided with a second accommodating cavity; and
        a second cell group disposed inside the second accommodating cavity, and
    wherein the first cell group is at least partially disposed inside the first battery pack accommodating cavity and the second cell group is at least partially disposed outside the first battery pack accommodating cavity.

2. The power tool according to claim 1, wherein the first cell group comprises a plurality of first cells, the second cell group comprises a plurality of second cells, the plurality of first cells are disposed inside the first accommodating cavity, the plurality of second cells are disposed inside the second accommodating cavity, and a ratio of a number of the plurality of first cells to a number of the plurality of second cells is greater than or equal to 0.3 and less than or equal to 2.

3. The power tool according to claim 2, wherein the battery pack accommodating portion is further provided with the second battery pack accommodating cavity, the basic housing portion is disposed inside the first battery pack accommodating cavity, and the extended housing portion is disposed inside the second battery pack accommodating cavity.

4. The power tool according to claim 2, wherein each of the plurality of first cells is a cylinder centered on a first center line, each of the plurality of second cells is a cylinder centered on a second center line, and the first center line and the second center line are parallel to each other.

5. The power tool according to claim 2, wherein each of the plurality of first cells is a cylinder centered on a first center line, each of the plurality of second cells is a cylinder centered on a second center line, and the first center line and the second center line are perpendicular to each other.

6. The power tool according to claim 1, wherein a projection of the first cell group in a plane perpendicular to the first straight line does not overlap a projection of the second cell group in the plane.

7. The power tool according to claim 1, wherein the first battery pack accommodating cavity comprises a first sidewall disposed on a right side of the battery pack, a second sidewall opposite to the first sidewall, a third sidewall disposed on an upper side of the battery pack, and a fourth sidewall opposite to the third sidewall, an outer wall of the fourth sidewall defines a limit plane parallel to the first straight line, and the battery pack comprises a basic portion on one side of the limit plane and an extended portion on another side of the limit plane.

8. The power tool according to claim 7, wherein the fourth sidewall is provided with an opening penetrating through the battery pack accommodating portion along a second straight line, the opening opens rearward along the first straight line, and the second straight line is perpendicular to the first straight line.

9. The power tool according to claim 8, wherein a housing of the battery pack comprises a connecting housing portion for connecting the extended portion to the basic portion and the connecting housing portion passes through the opening.

10. The power tool according to claim 8, wherein a ratio of a dimension of the opening along the first straight line to a dimension of the first battery pack accommodating cavity along the first straight line is greater than or equal to 0.3 and less than 1.

11. The power tool according to claim 8, wherein a ratio of a dimension of the opening along the first straight line to a dimension of the first battery pack accommodating cavity along the first straight line is greater than or equal to 0.6 and less than or equal to 0.8.

12. The power tool according to claim 8, wherein the first sidewall is disposed on a right side of a midplane, the second sidewall is disposed on a left side of the midplane, and the midplane passes through the opening.

13. The power tool according to claim 7, wherein the first sidewall and a part of the third sidewall are integrally formed as a first integral piece, the second sidewall and another part of the third sidewall are integrally formed as a second integral piece, the first integral piece is detachably connected to the second integral piece, and the fourth sidewall connects the first integral piece to the second integral piece.

14. The power tool according to claim 7, wherein the power tool has a midplane perpendicular to the limit plane and the fourth sidewall is symmetrical about the midplane.

15. The power tool according to claim 1, wherein the battery pack further comprises a connecting housing portion for connecting the basic housing portion to the extended housing portion and the connecting housing portion is disposed between the basic housing portion and the extended housing portion such that a gap outside a housing of the battery pack is formed between the basic housing portion and the extended housing portion.

16. The power tool according to claim 15, wherein a thickness of the gap is greater than or equal to 2 mm and less than or equal to 20 mm.

17. The power tool according to claim 15, wherein the first cell group comprises a plurality of first cells each being a cylinder centered on a first center line, three or more first cells are disposed in a first plane parallel to the first center line, and a projection of the gap in the first plane is U-shaped.

* * * * *